March 25, 1930.
T. B. NETTLE ET AL
1,751,749
SANITARY MILK CABINET
Filed Aug. 12, 1927
2 Sheets-Sheet 1
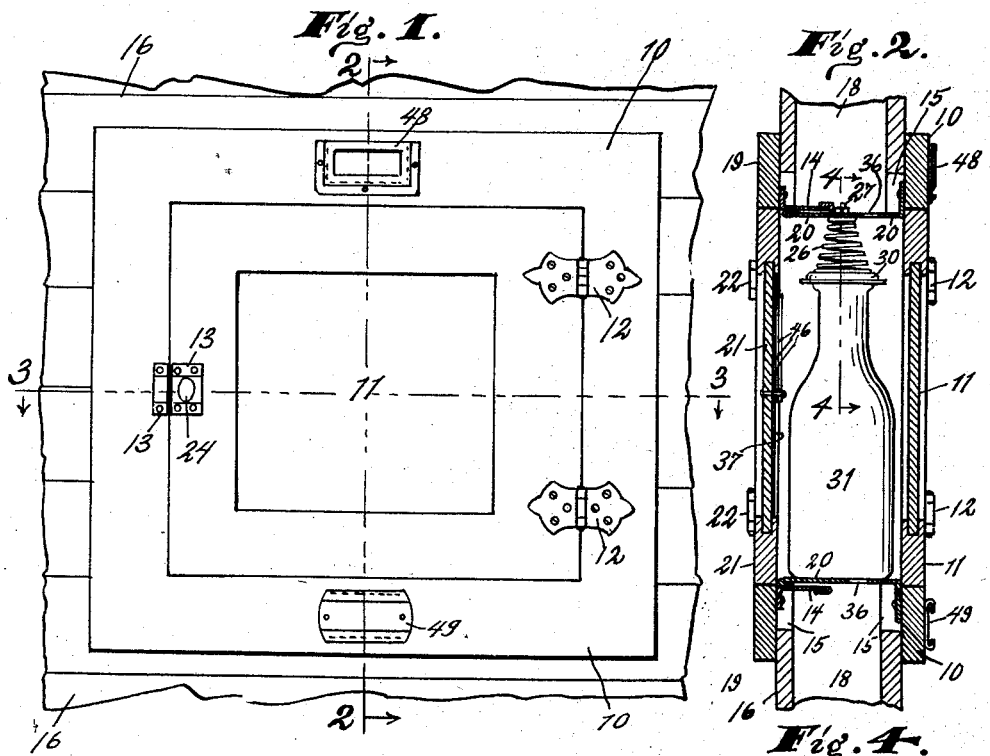
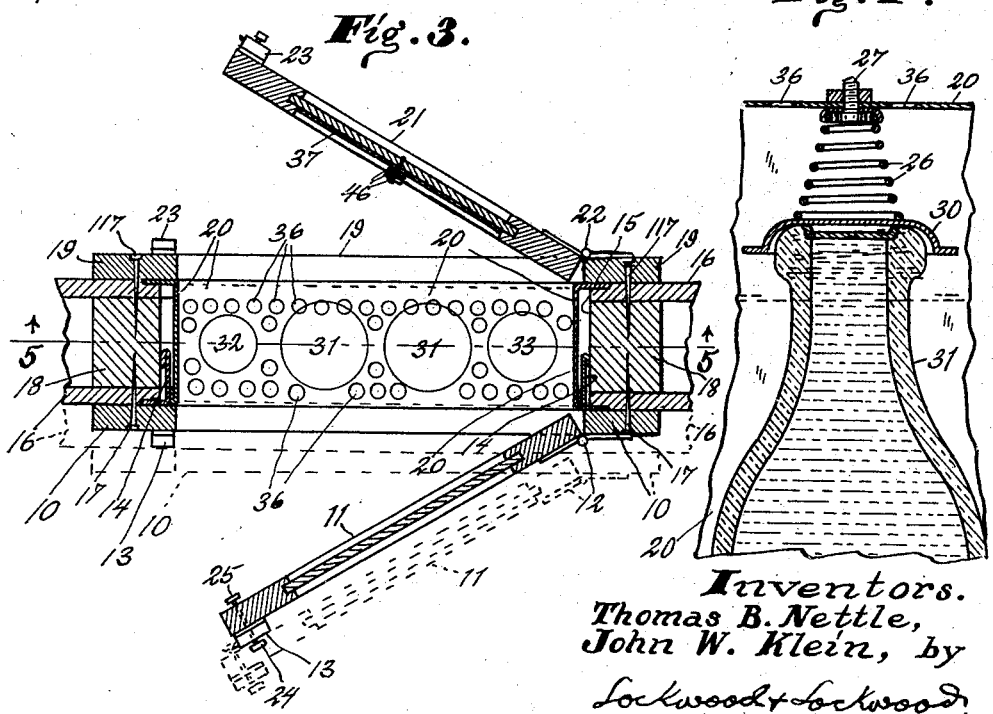
Inventors.
Thomas B. Nettle,
John W. Klein, by
Lockwood & Lockwood,
Their Attorneys.

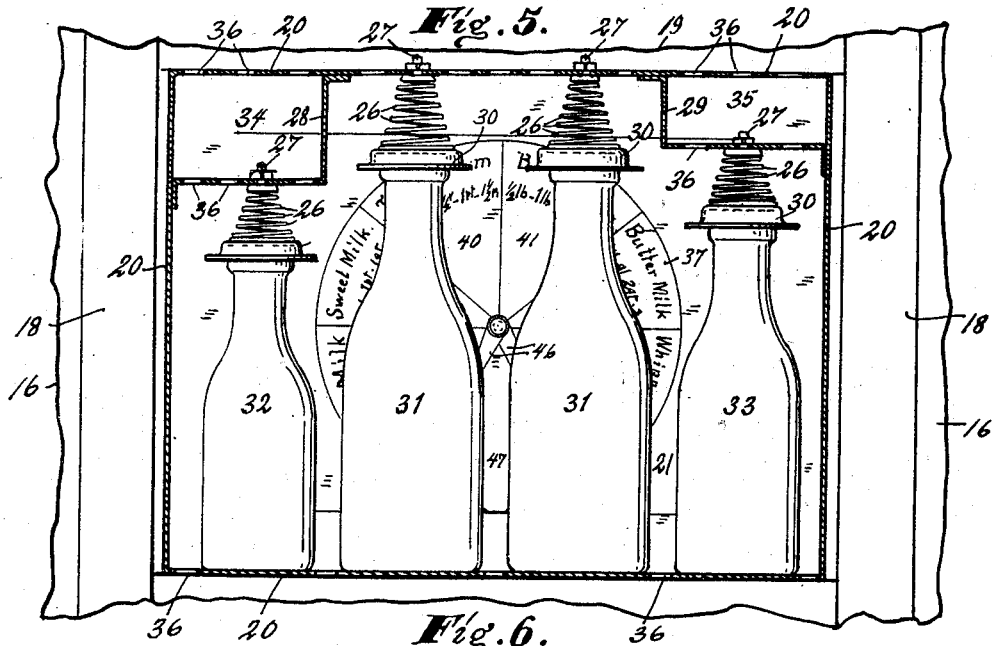
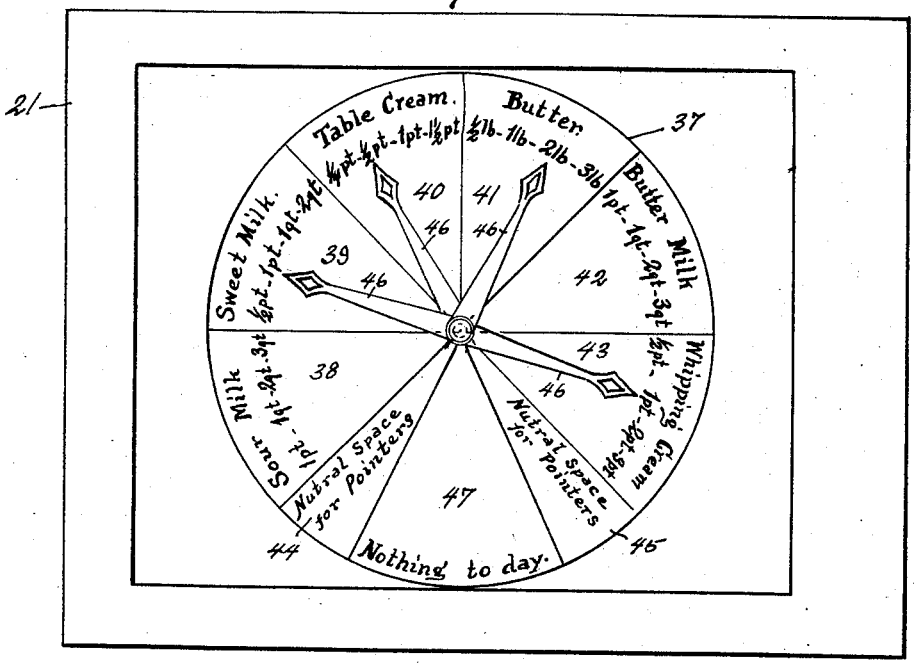

Patented Mar. 25, 1930

1,751,749

UNITED STATES PATENT OFFICE

THOMAS B. NETTLE AND JOHN W. KLEIN, OF HUNTINGTON PARK, CALIFORNIA

SANITARY MILK CABINET

Application filed August 12, 1927. Serial No. 212,380.

This invention relates to a sanitary cabinet for holding milk bottles and sealing their open ends, and an object thereof is to provide a simple and efficient means for holding and sealing the milk bottles so that they cannot easily be contaminated by contact with unsanitary things, such as insects and predatory animals such as mice, rats, cats and dogs.

An object of this invention is to provide a sanitary place for receiving a delivery of milk bottles that is convenient for both the deliveryman and the receiver. To that end the apparatus is constructed with a receiving chamber in a dwelling wall with an outer door through which the delivery is made that is convenient for the deliveryman to reach, and also an inner door through which the bottles are received so that the receiver can obtain the delivery without leaving the house, which is not only convenient but safe as well.

Features of invention are shown in the means for sealing the open ends of milk bottles of different lengths which includes a number of cone springs arranged centrally and suspended in the cabinet with caps in their lower ends adapted to engage the open ends of milk bottles, and with the springs arranged to hold the caps at different elevations suitable to engage bottles of different length so that when in use the springs will be under tension to hold the caps on the bottles. Also the springs are arranged so they can be moved out of their normal vertical position to tilt the caps when the bottles are being placed in or removed from the cabinet.

Features of invention are shown in the construction, combination and arrangement of the parts whereby a sanitary cabinet is provided that is easy to construct, assemble and install, efficient and durable in use and that is neat and pleasing in appearance.

Other objects, advantages and features of invention may appear from the accompanying drawings, the subjoined detailed description and the appended claim.

The accompanying drawings illustrate the invention.

Figure 1 is an outside view of a sanitary cabinet that is constructed in accordance with this invention, showing it arranged in the wall of a dwelling fragmentally shown. Fig. 2 is a fragmental vertical section on line 2—2 of Fig. 1 with the doors closed. Fig. 3 is a fragmental, horizontal section on line 3—3 of Fig. 1 showing the doors partly open and diagrammatically indicating the number of bottles, also, by dotted lines, showing the outer unit of the cabinet moved outward to compensate for a thicker wall. Fig. 4 is an enlarged fragmental section on line 4—4 of Fig. 2. Fig. 5 is an enlarged fragmental section on line 5—5 of Fig. 3, parts indicated diagrammatically; and Fig. 6 is a diagrammatic view of the inner door and the chart and pointers thereon.

The apparatus includes outer and inner members having extensions that are insertible in building walls of various thickness.

The outer member includes a rectangular frame 10 having a door 11 connected to it by hinges 12 and a latch 13, having inner and outer knobs 24, 25, and the door is arranged to open outwardly. A hollow rectangular extension 14 that is preferably formed of sheet iron or like material is secured to the inside of the frame 10 and arranged to be inserted in an opening 15 from the outside of a dwelling wall 16, and when so inserted the frame 10 is secured in place by nails 17 shown in Fig. 3. The opening 15 is preferably arranged between the studding 18 so that the nails will extend into the studding to fully support the apparatus.

An inner frame 19 of substantially the same dimensions as frame 10 is secured by nails 17 to the inside of the wall 16 over the opening 15 or in register with the outer frame 10. A hollow rectangular extension 20 that is preferably formed of sheet metal or the like is secured to the inner frame 19 and arranged to telescope into the extension 14 when the frames are secured to the wall 16. The extension 20 includes a floor, ceiling and side walls.

An inner door 21 is connected by hinges 22 to the inner frame 19 and the door is provided with a latch 23, and preferably the latch 23 is constructed so that the door 21 cannot be opened from the outside of the house.

A resilient means is provided for holding and effectively sealing the discharge ends of milk bottles and the like. This means comprises a number of cone springs 26 that have their small or top ends secured as by bolts 27 either to the ceiling or to the corner wall sections 28, 29. The large ends or bases of the cone springs 26 are soldered or otherwise secured to the top of the caps 30 so they are centrally arranged thereon. The caps are constructed and supported so they fit snugly over and in contact with the discharge ends of bottles 31 when the bottles are arranged in and seated on the cabinet floor, as shown in detail in Figs. 2 and 5, and the cone springs enable the caps to be tilted when the bottles are being placed in or removed from the cabinet, and also they enable the caps to automatically seat themselves on the discharge ends of the bottles. The wall sections 28, 29 are secured to the ceiling and side walls so they form supports for their respective springs that are arranged lower down than the center springs to engage shorter bottles 32, 33 such as are used for cream and the like. The compartments 34, 35 enclosed by the wall sections 28, 29 can be utilized for holding containers for butter, cottage cheese and the like.

The upper and lower wall of the extensions 14, 20 can be perforated by holes 36, as indicated in Figs. 3 and 5 so that air can circulate up around the containers and bottles in the cabinet. The caps are provided with annular rims that extend outward beyond the necks of the bottles to deflect the air from a direct vertical course to increase the circulation around the bottles.

If desired a card holder 48 can be placed at the top and on the outside of the frame 10 for the name of the receiver of the articles; and another card holder 49 can be placed on the bottom of the outside frame with the name of the company delivering the articles so as to avoid confusion when a series of cabinets are placed close together in apartments and the like.

In operation a deliveryman opens the door 11 and, when it is a bottle of milk or the like that he is delivering, he tilts the cap so he can seat the discharge end of the bottle centrally therein. Then he forces the bottle into the cabinet against the tension of the cone spring until the spring and bottles are in vertical positions with the latter resting on the cabinet floor. The tension of the spring will hold the cap seated on the bottle so as to exclude unsanitary things from engaging the discharge end of the bottle.

It is understood that all the bottles are placed in the cabinet in substantially the same way except that the large bottles, such as quarts, are placed in the center, and pints and half-pints at the ends of the cabinet.

We claim as our invention:

In a cabinet for holding milk bottles and sealing their open ends, the combination of a frame having a chamber therein, a plurality of springs arranged vertically, centrally and in alignment in said chamber, caps secured to the lower ends of said springs, means for supporting said springs so that said caps are supported at various elevations so they can be placed on milk bottles of various lengths, said springs arranged so they are under tension when said caps are seated on the bottles so as to hold the bottles in place and seal their open ends.

In witness whereof, we have hereunto affixed our signatures.

THOMAS B. NETTLE.
JOHN W. KLEIN.